US008370364B2

(12) United States Patent  
Rhoten

(10) Patent No.: US 8,370,364 B2  
(45) Date of Patent: Feb. 5, 2013

(54) DETERMINATION OF APPLICABLE TIME ZONE OF A WEB BROWSER

(75) Inventor: George W. Rhoten, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 12/719,807

(22) Filed: Mar. 8, 2010

(65) Prior Publication Data

US 2011/0218988 A1 Sep. 8, 2011

(51) Int. Cl.  
*G06F 17/30* (2006.01)
(52) U.S. Cl. .......................... 707/748; 707/752
(58) Field of Classification Search .................. 707/748, 707/752  
See application file for complete search history.

(56) References Cited

U.S. PATENT DOCUMENTS

| 7,948,832 | B1 * | 5/2011 | Luo et al. ................... 368/21 |
| 2003/0115258 | A1 * | 6/2003 | Baumeister et al. ........ 709/203 |
| 2007/0133501 | A1 * | 6/2007 | Park ........................... 370/350 |
| 2007/0201311 | A1 * | 8/2007 | Olson ......................... 368/29 |
| 2008/0250128 | A1 | 10/2008 | Sargent |
| 2011/0252107 | A1 * | 10/2011 | Chestnut et al. ............ 709/206 |

OTHER PUBLICATIONS

Ford et al. "Analyzing and Detecting Malicious Flash Advertisements", IEEE Xplorer Digital Library, Dec. 7, 2009.*
Fraser et al. "Auto Detect a time zone with JavaScrip", Onlineaspect.com, Jun. 8, 2007.*
Dischinger et al. "Detecting BitTorrent Blocking", IMC '08, Oct. 20-22, 2008.*
Dale Schultz, "Making Web browsers look smart with Domino 6," http://www.ibm.com/developerworks/lotus/library/ls-WebPref/index.html, Oct. 1, 2002, 10 pages.
Norbert Lindenberg, "Developing Multilingual Web Applications Using JavaServer Pages Technology," http://java.sun.com/developer/technicalArticles/Intl/MultilingualJSP/, Dec. 2003, 5 pages.
Lloyd Honomichl, "Accept-Language used for locale setting," http://www.w3.org/International/questions/qa-accept-lang-locales, Nov. 25, 2006, 3 pages.
Mark Kolb, "A JSTL primer, Part 3: Presentation is everything," http://www.ibm.com/developerworks/java/library/j-jstl0415/, Apr. 15, 2003, 17 pages.

* cited by examiner

*Primary Examiner* — Khanh Pham  
(74) *Attorney, Agent, or Firm* — Griffiths & Seaton PLLC

(57) ABSTRACT

Exemplary method, system, and computer program embodiments for establishing an applicable local time zone of a web browser in a computing environment are provided. In one such embodiment, a plurality of time zone offsets is queried over a predetermined period of time to obtain a listing of possible time zones. Ones of the listing of possible time zones matching a polled absolute coordinated universal time (UTC) offset are selected. A plurality of weights are assigned to the selected ones of the listing of possible time zones based on at least one of the matching polled absolute UTC offset, a matching daylight savings observance type, a matching Hyper-Text Transfer Protocol (HTTP) accept-language header and a human population size. The listing of possible time zones is sorted based on the plurality of assigned weights.

20 Claims, 5 Drawing Sheets

DETERMINATION OF APPLICABLE TIME ZONE OF A WEB BROWSER

BACKGROUND OF THE INVENTION

1. Field of the Invention

The present invention relates in general to computers, and more particularly to apparatus, method and computer program product embodiments for detecting and establishing an applicable time zone for a web browser operable in a computing environment.

2. Description of the Related Art

Computers and computer systems are found in a variety of settings in today's society. Computing environments and networks may be found at home, at work, at school, in government, and in other settings. Interconnected computing environments have led to the emergence of the World-Wide-Web (WWW) or Internet as a vehicle by which a client computer may communicate, sometimes over long distances, with a server or host computer. The client computer may implement an application, such as a browser, which is configured to transmit and interpret data received and/or sent to the server over the WWW.

Information provided through browsers to/from clients and servers has become increasingly prevalent and complex. Many applications historically installed on a user's computer, for example, are now hosted and presented to the user over the WWW via a browser application. In this manner, the web browser may function as an intermediary to bring information resources to the user. The information resources may be characterized by a web page, image, video, or other content.

SUMMARY OF THE DESCRIBED EMBODIMENTS

Web server applications often rely on current time information of a web browsing user in order to present or interpret accurate information. For example, an entertainment provider may use time zone information to facilitate an accurate schedule of available content. Determining, however, an applicable time zone of a client computer operating a web browser has historically been both challenging and oftentimes inaccurate.

Unlike the Hyper Text Transfer Protocol (HTTP) accept-language header used for determining an applicable local language of a client browser, no queryable property is available to determine local time zone information. Furthermore, languages commonly used in conjunction with web browser applications do not provide an exact time zone name and instead, for example, provide an absolute time offset without accompanying information that may affect a time zone determination based on the absolute time offset such as daylight saving transition rules.

Most publically available solutions for determining an applicable time zone solely take into account the aforementioned absolute time offset. These solutions, as a result, cannot distinguish between time zones subject to varying political geography, such as a U.S. time zone and a Mexico time zone having equivalent longitude, but observing different start and end dates of daylight saving time between the years 2007 through 2009. The solutions either do not attempt to account for factors such as daylight saving transitions, or hard code the factors into an incomplete list of time zone possibilities.

In view of the foregoing, a need exists for a mechanism to accurately, and without the expenditure of unneeded computing resources, obtain the applicable time zone of a web browser. Accordingly, various system, method, and computer program product embodiments for establishing an applicable local time zone of a web browser in a computing environment are provided. In one embodiment, by way of example only, a plurality of time zone offsets is queried over a predetermined period of time to obtain a listing of possible time zones. Ones of the listing of possible time zones matching a polled absolute coordinated universal time (UTC) offset are selected. A plurality of weights are assigned to the selected ones of the listing of possible time zones based on at least one of the matching polled absolute UTC offset, a matching daylight savings observance type, a matching Hyper-Text Transfer Protocol (HTTP) accept-language header and a human population size. The listing of possible time zones is sorted based on the plurality of assigned weights.

In addition to the foregoing exemplary embodiment, various other method, system, and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments provide mechanisms for determining the applicable local time zone setting of a web browser operable in a computing environment between a client and an interconnected server, for example. As will be further described, the mechanisms of the present invention implement methodologies for taking various factors into account in order for an informed decision to be made concerning a most likely possibility of the local time zone. These factors may be used, for example, to weight various possibilities of time zones to make the most accurate decision. In some cases, only a single result may be obtained. In other cases, a list of possible time zones may be sorted and the most likely possibility selected, again, as will be further described.

Figure 1:
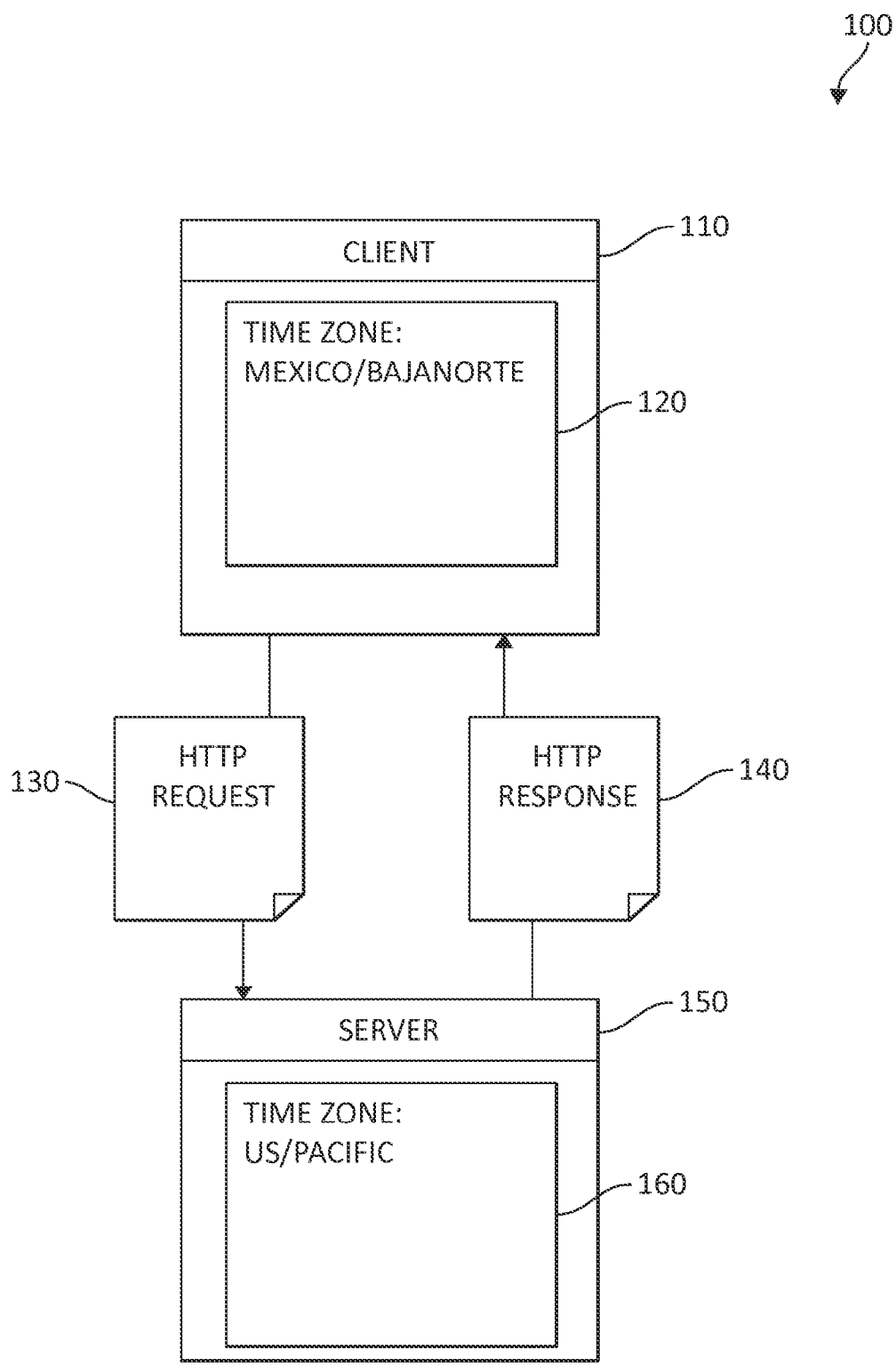
FIG. 1 illustrates a block diagram of an exemplary relationship between a client and a server over an interconnected network.

Turning first to FIG. 1, following, a block diagram of an exemplary relationship 100 between a client 110 and a server 150 is depicted. Relationship 100 illustrates a typical scenario seen across the WWW, where a client is operable in one locality but the server is operable in a remote region from the client locality. As shown, the applicable time zone setting for the client 110 is the Mexico/BajaNorte time zone 120. The applicable time zone setting for the server 150 is the U.S./Pacific time zone 160. The server 150 and/or client 110 typically send and receive a number of HTTP requests 130 and responses 140 between each other, as one of ordinary skill in the art will appreciate.

Figure 2:
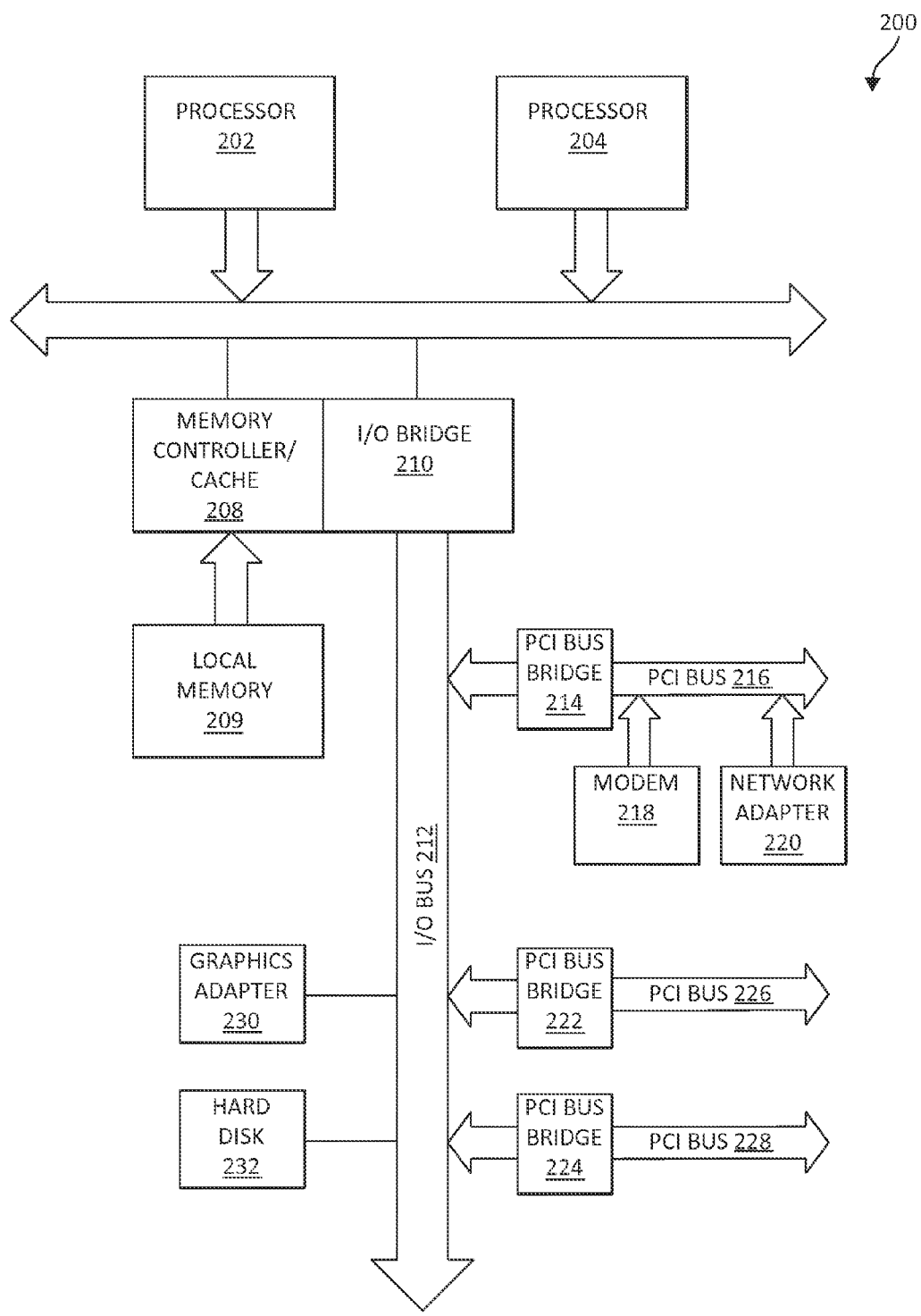
FIG. 2 illustrates a block diagram of an exemplary data processing system that may be implemented as a server or a client in a computing environment.

Referring to FIG. 2, a block diagram of an exemplary data processing system 200 is illustrated that may be implemented as a server 150 or a client 110 in FIG. 1, in accordance with the present description and claimed subject matter. System 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

A peripheral component interconnect (PCI) bus bridge 214 connected to I/O bus 212 provides an interface to PCI local bus 216. Typical PCI bus implementations will support four PCI expansion slots or add-in connectors. Communications links to server 150 or client 110, depending on whether system 200 is a client 110 or server 150 (FIG. 1) may be provided through modem 218 and network adapter 220 connected to PCI local bus 216 through add-in connectors. Network adapter 220 may be connected to a local area network (LAN) and/or a wide area network (WAN) such as the world-wide-web (WWW) using a variety of communications protocols as the skilled artisan will appreciate, such as Ethernet.

In the case of system 200 configured as a server 150 (FIG. 1), additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives, solid state drives (SSDs) and the like, also may be used in addition to or in place of the hardware depicted. The depicted example is not meant to imply architectural limitations with respect to the present invention.

The data processing system depicted in FIG. 2 may be, for example, an IBM eServer™ pSeries® system, a product of International Business Machines Corporation in Armonk, N.Y., running the Advanced Interactive Executive (AIX™) operating system or LINUX operating system. The functionality of the illustrated embodiments may be performed on such a data processing system, or any other computing platform, operating system (OS), mobile device, tablet device, laptop, etc., as one of ordinary skill in the art will appreciate.

As previously indicated, the illustrated embodiments employ methodologies for examining various time zone factors, in order to determine a most likely possibility of the local time zone. Again, these factors may be used, for example, to weight various possibilities of time zones to make the most accurate decision. In some cases, only a single result may be obtained. In one embodiment, for example, information obtained from the HTTP accept-language header may be used in combination with other detectable information, such as the time zone offset of at least 2 date objects to perform such weighting. The other detectable information may be obtained from a time zone database, as will be further described, which includes code and data representing the history of local time for representative locations around the globe. Such information may be used to associate various time zones with particular locations, countries of origin, and applicable time zone rules, such as daylight saving time rules.

In addition to the forgoing, two or more Coordinated Universal Time (UTC) offsets may be queried over a predetermined period of time to obtain a listing of possible time zones. The listing of possible time zones are analyzed in combination with other information in a priority order, such as that described previously, a reduced ranked list of time zones may be then obtained. Some of the detectable information may be assigned a higher weight relative to other detectable information. For example, the listing of possible time zones may include one time zone associated with a geographic locality having a small population, while another time zone may be associated with another geographic locality having a higher population. In one example of the aforementioned weighting process, the time zone associated with the higher population may be assigned a higher weight relative to the time zone associated with the small population. Ultimately, the time zone having a highest ranking, based on the previously described weighting, may then be selected as the applicable time zone.

In one embodiment, some possible time zones may be merged by using a window of historical comparison. The time zones having the same daylight saving transition rules over this historical period may be merged into one time zone. Such merger functionality becomes important if a time zone observed a certain set of daylight saving rules in the distant past, but now observes a differing set of time zone rules in more recent history. For example, there were 21 time zone updates around the world in the year 2009 alone.

Figure 3:
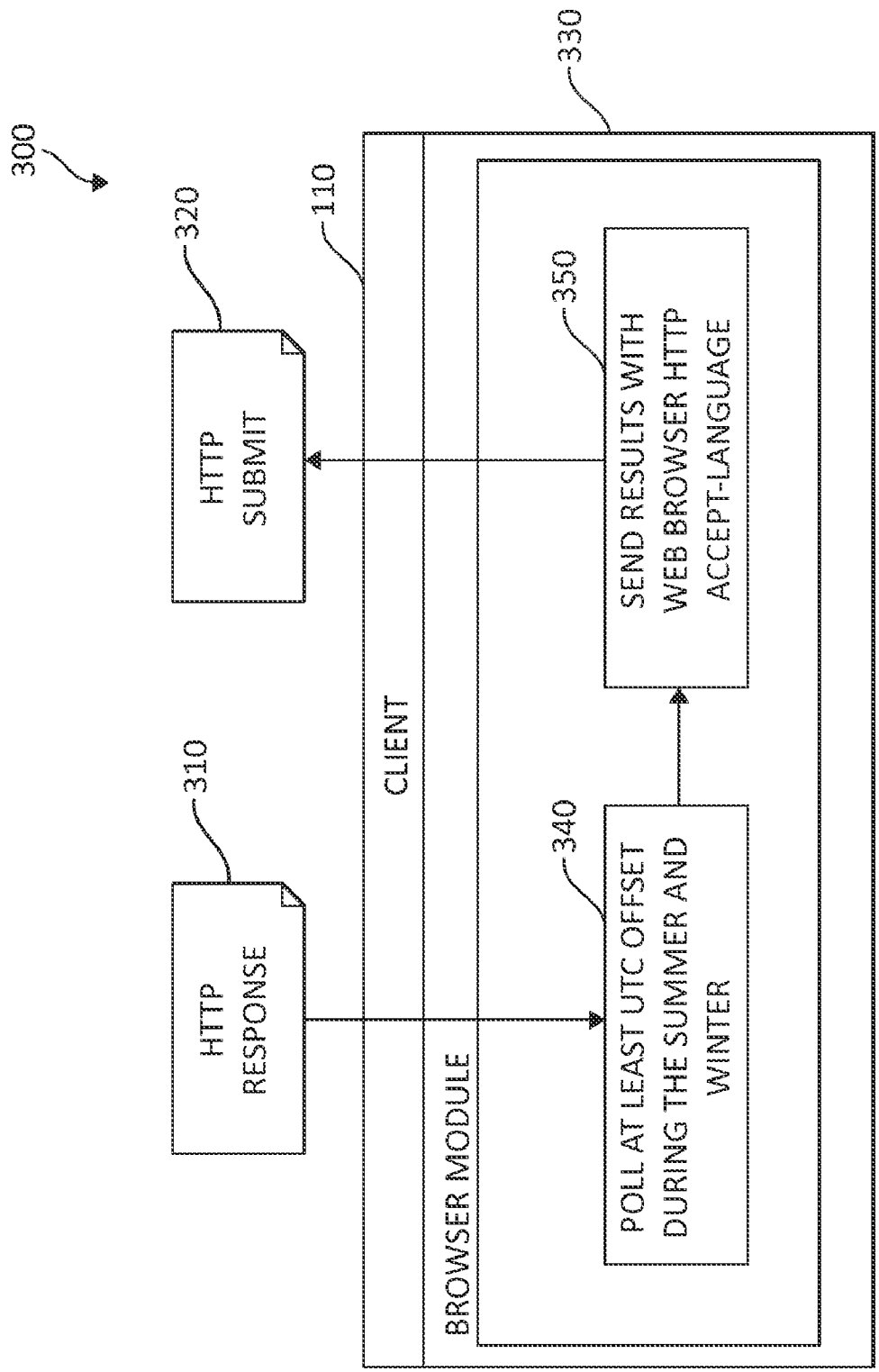
FIG. 3 illustrates a block/flow diagram of exemplary functionality of a browser module operable on a client in a computing environment in accordance with the present invention.

The functionality described above is further illustrated in FIGS. 3, and 4, following, which depict various exemplary methods for determining an applicable time zone as will be further described. In FIG. 3, the client 110 is shown in configuration 300 sending and receiving HTTP messages 310 and 320. Again, one of ordinary skill in the art will appreciate that the client 110 may send and receive HTTP messages according to a particular implementation. As shown, the client 110 receives HTTP response 310 by browser module 330 from the server 150 (FIGS. 1, 4) in an attempt to determine the applicable time zone for the browser operable by the client 110.

Exemplary functionality performed by the browser module is depicted in FIG. 3 in a flow diagram form and now described. Pursuant to the HTTP response 310, the browser module 330 polls the applicable local UTC offset during the summer and winter solstices (represented by box 340). This information is then combined with the web browser's standard HTTP accept-language information and sent to the server (represented by box 350) in an HTTP submit message 320 as shown.

Figure 4:
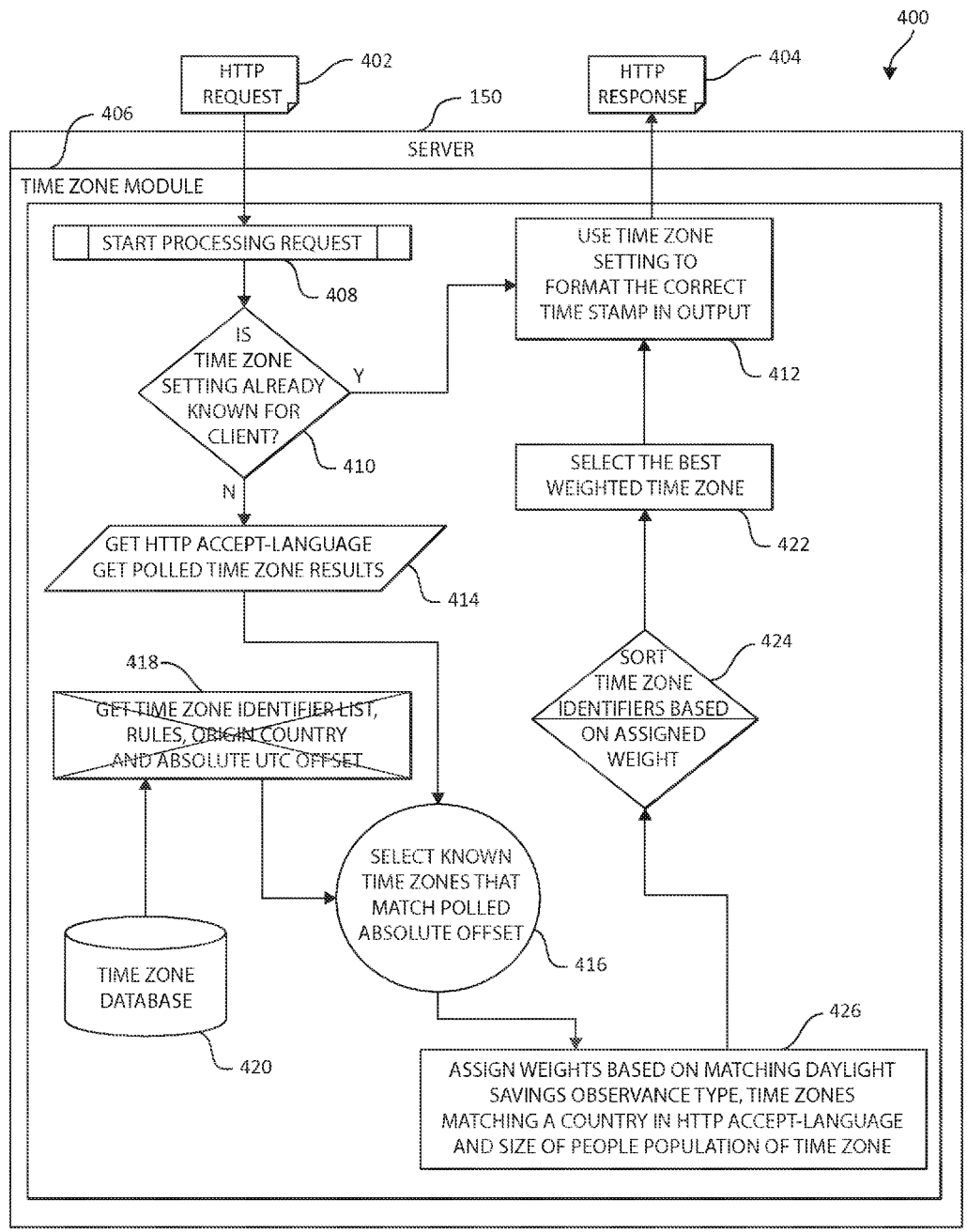
FIG. 4 illustrates a block/flow diagram of exemplary functionality of a time zone module operable on a server in a computing environment in accordance with the present invention.

FIG. 4, following, depicts server 150 in configuration 400, sending and receiving HTTP messages 402 and 404. A time zone module 406 is shown operable on the server 150. Additional functionality performed by the time zone module 406 is further depicted as a flow diagram and described below. Here again, one of ordinary skill in the art will appreciate that various aspects of the configuration 400 such as the number, size, timing, etc. of the HTTP messages 402 and 404 may vary according to a particular implementation.

The time zone module begins processing the HTTP request 402 in step 408. In one embodiment, the HTTP request 402 may include the UTC offset and HTTP accept-language information obtained from the client 110 (FIG. 3) as previously described. If the applicable time zone setting is already known for the client (step 410), then the known time zone setting is used to format the correct time stamp in an output (step 412). In other embodiments, the time zone setting may not solely be used in a time stamp setting as one of ordinary skill in the art will appreciate. For example, the time zone setting may be used for more accurately showing time stamps in an online message board.

Returning to step 410, if the time zone setting is not already known, the HTTP accept-language information and polled time zone results are obtained for the client (step 414). To generate a listing of possible time zones, other information may be obtained from either the client, a time zone database 420, or another location as one of ordinary skill in the art will appreciate. In one embodiment, this additional information may include a stored time zone identifier listing, time zone rules, an applicable origin country, and an absolute UTC offset (step 418). The additional information may be based on a historical window previously described, such as a listing of time zone offsets queried over a two-year period for a certain location.

As previously described, the time zone database may be one of several possible public-domain databases having code and data representative of the history of local time for many representative locations. It may be updated periodically to reflect changes made by political bodies to time zone boundaries, UTC offsets, and daylight-saving rules. In one embodiment, each location in the database represents a national region where all clocks keeping local time have agreed since a particular date, such as 1970, for example. Locations are identified by continent or ocean and then by the name of the location, which is typically the largest city within the region. For example, America/New_York may be representative of much of the U.S. eastern time zone. America/Phoenix represents much of Arizona, which uses mountain time without daylight saving time (DST). In this exemplary embodiment, time zone information is stored as data files downloadable and compilable into machine-readable binary files, one for each location.

In some cases, two or more time zones having the equivalent daylight saving transition rules over the historical window may be merged into a single time zone as previously indicated. Based on all of the information available, including the exemplary information previously described, the known time zone(s) that match the absolute UTC offset information are gathered into a listing of possible time zones (step 416).

As a next step, a number of weights are assigned to each possible time zone in the listing generated in step 416 previously. These weights may correspond to a number of time zone factors. For example, the factors may include a matching absolute time zone offset from UTC time, a matching daylight savings observance type, time zone(s) matching a country corresponding to information obtained from the HTTP accept-language header, and a human population size observing a respective time zone (i.e., and as previously mentioned, a time zone corresponding to a location with a higher human population may be assigned a higher weight than a time zone corresponding to a location with a low population).

Based on each of the assigned weights, the listing of possible time zones is sorted (step 424). A "best" or highest weighted time zone is then selected (step 422). The selected time zone is then used in an output setting, for example as previously described for use in a time stamp setting (again, step 412). The output is then incorporated into what ultimately becomes the HTTP response step 404 (such as content corresponding to the appropriate time zone setting).

Consider the following example of the weighting process of various detectable information as previously described, and the process of obtaining a best-weighted time zone. While the following describes one example of a weighting process, one of ordinary skill in the art will appreciate that a variety of weighting practices may be employed.

To begin, a UTC time offset for a geographic location corresponding to a particular longitude may be obtained. The longitude places the time at one of several possible locations, such as either in Arizona, U.S. Mountain Time zone, Mexico, or Canada. The Mexican and Canadian locations corresponding to the UTC offset are identified to have much lower human populations than those of the Arizona and U.S. Mountain Time zone locations. The U.S. Mountain and Arizona regions are assigned a higher weight than those time zones corresponding to the Mexican and Canadian locations. In arbitrary terms, for example, those of the U.S. Mountain and Arizona regions may be assigned a weight of "2," while the Mexican and Canadian locations may be assigned a weight of "1."

In addition to assigning weights to the possible time zones based on population size, additional weighting is performed based on additional information. The applicable language from the HTTP accept-language header is identified to be English. As a result, those of the list of possible time zones matching the English language are assigned a higher weight than those locations not matching the English language, such as Mexico. Returning to the arbitrary weights previously mentioned, those locations matching the English language may be assigned a weight of 2, while those not matching the English language may be assigned a weight of 1. These weights may be added to the previous weights. As a result, the U.S. Mountain and Arizona regions have a combined weight of 4, while the Mexico region has a combined weight of 2 and the Canadian region has a combined weight of 3.

Taking the present example further, a matching daylight savings observance type identifies the location as not observant of daylight savings. Accordingly, those of the listing of possible time zones not observing a daylight savings type (i.e., Arizona in this case) are assigned a higher weight. Here again, these weights may be added to the previous combined weights for each location. Following the same weighting process previously described, the Arizona location is left with a combined weight of 6.

Following the weighting process, the listing of possible time zones may be ordered in terms of the weights previously assigned. Those with a larger combined weight are ordered higher in the listing of possible time zones than those with a lower combined weight. In view of the present example, because the Arizona time zone (1) does not observe daylight savings time rules, (2) corresponds to an English language, and (3) has a higher relative population size than the Mexican and Canadian locations, it is weighted and correspondingly ranked highest on the list of possible time zones and thus selected.

Figure 5:
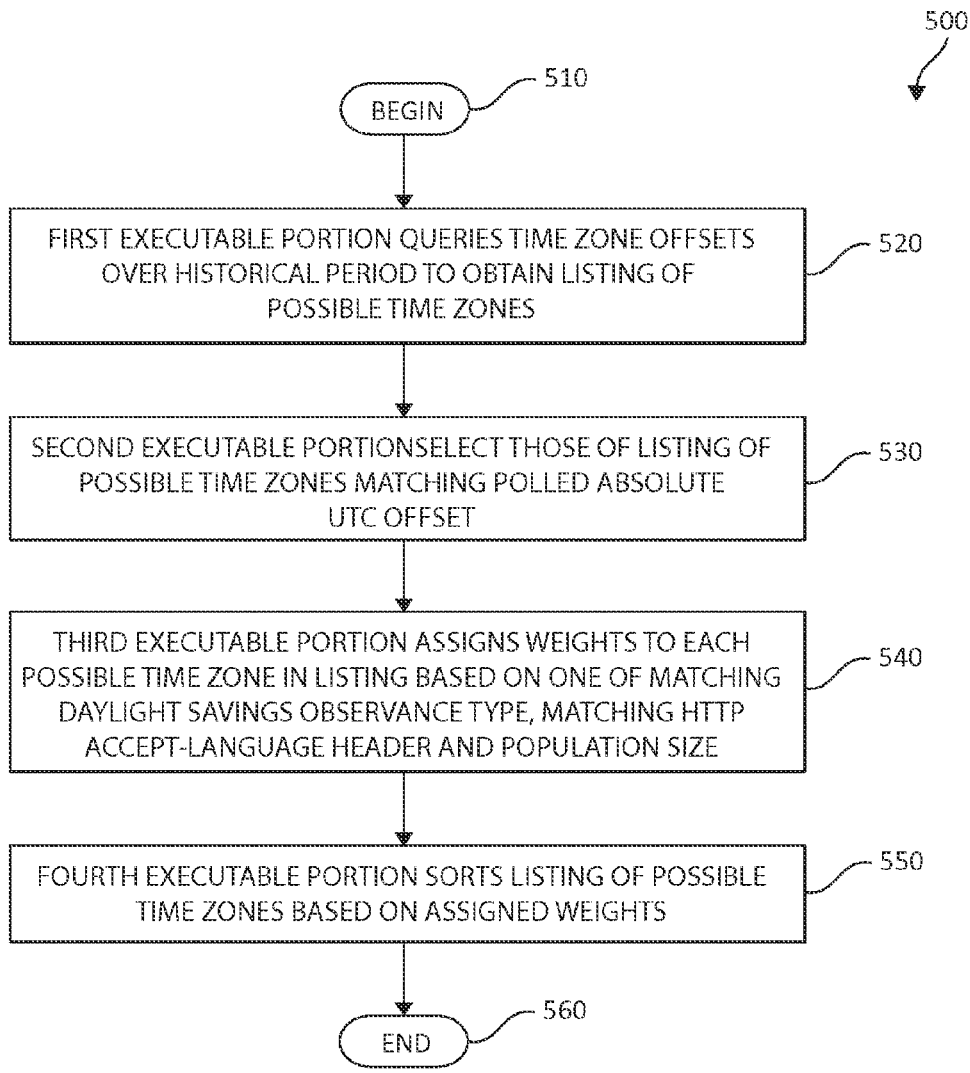
FIG. 5 illustrates a flow chart diagram of an exemplary computing program product adapted for implementing aspects of the present invention.

FIG. 5 illustrates a flow chart diagram of a method 500 of operational steps for a computing program product adapted for implementing aspects of the present invention. Method 500 begins (step 510) by a first executable portion querying time zone offset information over a historical period to obtain a listing of possible time zones (step 520). A second executable portion selects those of the listing of possible time zones matching a polled absolute UTC offset (step 530). A third executable portion assigns weights to each time zone matching the time zone offset in the listing based on one of a matching absolute UTC offset, a matching daylight savings observance type, a matching HTTP accept-language header and a human population size observing a given time zone (step 540). A fourth executable portion sorts the listing of possible time zones based on the assigned weights (step 550). The method 500 then ends (step 560).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for establishing an applicable local time zone of a web browser in a computing environment by a processor device, comprising:
    querying a plurality of time zone offsets over a predetermined period of time to obtain a listing of possible time zones;
    selecting one of the listing of possible time zones matching a polled absolute coordinated universal time (UTC) offset;
    assigning a plurality of numerical weights to the selected ones of the listing of possible time zones according to a weighting process based on the matching polled absolute UTC offset, a matching daylight savings observance type, a matching Hyper-Text Transfer Protocol (HTTP) accept-language header, and a human population size;
    combining each of the assigned plurality of numerical weights to generate a combined numerical weight for the selected ones of the listing of possible time zones;
    sorting the listing of possible time zones based on the combined numerical weight; and selecting one of the listing of sorted possible time zones having a highest combined numerical weight of the plurality of assigned numerical weights to format a time stamped output.

2. The method of claim 1, wherein querying the plurality of time zone offsets is performed against a time zone database.

3. The method of claim 1, further including merging some of the listing of possible time zones by grouping those of the listing of possible time zones having shared daylight saving transition rules over the predetermined period of time.

4. The method of claim 3, further including obtaining the shared daylight saving transition rules from a time zone database.

5. The method of claim 1, further including, previous to querying the plurality of time zone offsets, determining if a time zone setting is known.

6. The method of claim 5, wherein if the time zone setting is known, selecting the time zone setting to format a time stamped output.

7. The method of claim 1, further including, subsequent to the selecting one of the listing of sorted possible time zones having the highest combined numerical weight, incorporating the selected one of the listing of sorted possible time zones into a Hyper-Text Transfer Protocol (HTTP) response.

8. A system for establishing an applicable local time zone of a web browser in a computing environment, comprising:
   a processor device operable in the computing environment; and
   a time zone module, operable by the processor device in the computing environment in collaboration with the web browser, wherein the time zone module is adapted for:
      querying a plurality of time zone offsets over a predetermined period of time to obtain a listing of possible time zones,
      selecting ones of the listing of possible time zones matching a polled absolute coordinated universal time (UTC) offset,
      assigning a plurality of numerical weights to the selected ones of the listing of possible time zones according to a weighting process based on the matching polled absolute UTC offset, a matching daylight savings observance type, a matching Hyper-Text Transfer Protocol (HTTP) accept-language header, and a human population size,
      combining each of the assigned plurality of numerical weights to generate a combined numerical weight for the selected ones of the listing of possible time zones,
      sorting the listing of possible time zones based on the combined numerical weight, and
      selecting one of the listing of sorted possible time zones having a highest combined numerical weight of the plurality of assigned numerical weights to format a time stamped output.

9. The system of claim 8, wherein the time zone module is further adapted for querying the plurality of time zone offsets against a time zone database.

10. The system of claim 8, wherein the time zone module is further adapted for merging some of the listing of possible time zones by grouping those of the listing of possible time zones having shared daylight saving transition rules over the predetermined period of time.

11. The system of claim 10, wherein the time zone module is further adapted for obtaining the shared daylight saving transition rules from a time zone database.

12. The system of claim 8, wherein the time zone module is further adapted for, if the time zone setting is known, selecting the time zone setting to format a time stamped output.

13. The system of claim 8, wherein the time zone module is further adapted for, subsequent to the selecting one of the listing of sorted possible time zones having the highest combined numerical weight, incorporating the selected one of the listing of sorted possible time zones into a Hyper-Text Transfer Protocol (HTTP) response.

14. A computer program product for establishing an applicable local time zone of a web browser in a computing environment, the computer program product comprising a computer-readable storage medium having computer-readable program code portions stored therein, the computer-readable program code portions comprising:
   a first executable portion for querying a plurality of time zone offsets over a predetermined period of time to obtain a listing of possible time zones;
   a second executable portion for selecting ones of the listing of possible time zones matching a polled absolute coordinated universal time (UTC) offset;
   a third executable portion for assigning a plurality of numerical weights to the selected ones of the listing of possible time zones according to a weighting process based on the matching polled absolute UTC offset, a matching daylight savings observance type, a matching Hyper-Text Transfer Protocol (HTTP) accept-language header, and a human population size;
   a fourth executable portion for combining each of the assigned plurality of numerical weights to generate a combined numerical weight for the selected ones of the listing of possible time zones;
   a fifth executable portion for sorting the listing of possible time zones based on the combined numerical weight; and
   a sixth executable portion for selecting one of the listing of sorted possible time zones having a highest combined numerical weight of the plurality of assigned numerical weights to format a time stamped output.

15. The computer program product of claim 14, further including a sixth executable portion for querying the plurality of time zone offsets against a time zone database.

16. The computer program product of claim 14, further including a sixth executable portion for merging some of the listing of possible time zones by grouping those of the listing of possible time zones having shared daylight saving transition rules over the predetermined period of time.

17. The computer program product of claim 16, further including a seventh executable portion for obtaining the shared daylight saving transition rules from a time zone database.

18. The computer program product of claim 14, further including a sixth executable portion for, previous to querying the plurality of time zone offsets, determining if a time zone setting is known.

19. The computer program product of claim 18, further including a seventh executable portion for, if the time zone setting is known, selecting the time zone setting to format a time stamped output.

20. The computer program product of claim 14, further including a fifth executable portion for, subsequent to the selecting one of the listing of sorted possible time zones having the highest combined numerical weight, incorporating the selected one of the listing of sorted possible time zones into a Hyper-Text Transfer Protocol (HTTP) response.

* * * * *